United States Patent
Wright

(10) Patent No.: US 9,396,860 B1
(45) Date of Patent: Jul. 19, 2016

(54) COMPLIANT PLUNGER FOR LATCHING SOLENOID

(71) Applicant: Dana Automotive Systems Group, LLC, Maumee, OH (US)

(72) Inventor: Robert A Wright, Haskins, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 14/798,430

(22) Filed: Jul. 13, 2015

(51) Int. Cl.
*F16D 27/108* (2006.01)
*H01F 7/124* (2006.01)
*H01F 7/16* (2006.01)
*F16D 27/09* (2006.01)
*F16D 27/02* (2006.01)
*F16H 48/34* (2012.01)
*F16D 27/118* (2006.01)

(52) U.S. Cl.
CPC ............... *H01F 7/124* (2013.01); *F16D 27/02* (2013.01); *F16D 27/09* (2013.01); *F16D 27/108* (2013.01); *F16D 27/118* (2013.01); *F16H 48/34* (2013.01); *H01F 7/1638* (2013.01)

(58) Field of Classification Search
CPC ......... H01F 7/124; F16D 27/02; F16D 27/09; F16D 27/108; F16D 27/118; F16H 48/34; F16H 2048/343; F16H 2048/346
USPC .................. 192/84.92, 84.93, 84.96; 475/150
See application file for complete search history.

(56) References Cited

U.S. PATENT DOCUMENTS

| | | | |
|---|---|---|---|
| 4,391,356 | A | 7/1983 | Takemura |
| 4,719,943 | A | 1/1988 | Perach |
| 4,808,870 | A | 2/1989 | Gonda |
| 5,156,247 | A | 10/1992 | Wiese |
| 5,237,882 | A | 8/1993 | Giometti |
| 5,752,308 | A | 5/1998 | Maley et al. |
| 5,884,896 | A | 3/1999 | Kono et al. |
| 6,178,791 | B1 | 1/2001 | Hill et al. |
| 6,231,077 | B1 | 5/2001 | Karolek et al. |
| 6,249,418 | B1 | 6/2001 | Bergstrom |
| 6,945,895 | B2 | 9/2005 | Fusegi |
| 7,074,150 | B2 | 7/2006 | Fusegi |
| 7,431,262 | B2 | 10/2008 | Sturman et al. |
| 7,887,450 | B2 | 2/2011 | Fusegi |
| 8,454,471 | B2 | 6/2013 | Isken, II |
| 8,591,375 | B2 | 11/2013 | Maruyama |
| 2006/0219513 | A1 | 10/2006 | Organek |

*Primary Examiner* — Ramon M Barrera
(74) *Attorney, Agent, or Firm* — Marshall & Melhorn, LLC

(57) ABSTRACT

Described herein is a compliant plunger for a latching solenoid. The compliant plunger prevents disengagement of the solenoid when the solenoid is subjected to incidental axial movement. The compliant plunger takes advantage of a compressible compliance device to absorb the incidental axial movement.

12 Claims, 2 Drawing Sheets

COMPLIANT PLUNGER FOR LATCHING SOLENOID

FIELD OF THE INVENTION

The present invention relates to methods and systems for securing a latching actuator. The actuator is secured by a complaint plunger designed to aid in maintaining the engagement of the actuator. In certain embodiments, the invention relates to actuators for use in power take-off units or vehicular drivetrain systems, such as differentials, axle disconnect systems, or power transfer units. In a specific embodiment, the invention relates to an actuator for use in an axle disconnect system.

BACKGROUND OF THE INVENTION

In the automotive industry, actuators are used for a number of purposes, including in vehicular systems such as power take-off units and drivetrain systems such as differentials, axle disconnect systems, or power transfer units. As just one example, typical all-wheel drive systems for vehicles push torque through a torque coupling to the secondary axle to provide enhancements in performance, handling and mobility. These systems require that the secondary axle, and the rest of the driveline, be continually rotating at road speed, which reduces the overall efficiency of the vehicle, and reduces fuel economy.

Secondary axle disconnects are available and they permit the secondary axle and prop shaft to stop rotating. These disconnect systems increase vehicle efficiency, but the current systems also require power to both engage and disengage the output and/or remain engaged or disengaged. The latter situation may require constant power to the system, which reduces overall system efficiency, or may require the use of permanent magnets.

As is known in the art, the actuator converts electrical current into mechanical force. The flow of electrical current into the actuator creates a magnetic field that moves a metal armature which, via additional mechanical elements, results in a change in the engagement/disengagement status of the particular drivetrain or other vehicular system, such as the axle disconnect system described briefly above.

Traditionally, when the actuator was energized, the armature would be drawn towards the solenoid as a result of the magnetic field generated, engaging the axle disconnect system. If it was desirable to keep the system engaged, either current would have to be continually applied or permanent magnets would have to be included in the design of the actuator so that the armature would stay in the engaged position. For obvious reasons, it is not desirable to have a solenoid draw significant power when holding the system engaged (or disengaged).

Latching solenoids can also accomplish maintained engagement with a permanent magnet in the system. Use of permanent magnets has undesirable consequences such as temperature demagnetization and shock demagnetization. In addition, depending on the material, permanent magnets can be costly, difficult to fasten, and can be fragile.

In a previous invention, filed as U.S. Prov. Appln. Ser. No. 62/023,944 filed Jul. 13, 2014, and PCT Appln. No. PCT/US15/40195 filed Jul. 13, 2015, both of which are hereby incorporated herein to the full extent permitted by law, an actuator was described that takes advantage of the residual magnetism in the coil housing that remains even after power to the solenoid has been shut off. The previous invention uses this residual magnetism to keep the actuator in an engaged position without a continual power draw.

However, in any of the given situations described above, a latching solenoid is unable to tolerate any incidental movement of the plunger. Incidental movement can cause the solenoid to become fully disengaged and will result in a loss of engagement of the system. The latching solenoid would need to be reactivated to correct the accidental disengagement. The invention described herein allows for the plunger to remain engaged while allowing for unintended force to be absorbed before causing disengagement. The particulars of the plungers of the invention can be tuned to suit the application requirements.

SUMMARY OF THE INVENTION

The disclosure herein describes an actuator with an electromagnetic coil comprising copper windings disposed in an overmold, a housing at least partially surrounding the coil, a slide ring radially inward from the housing, wherein the slide ring is in sliding engagement with the housing, and wherein the slide ring has a radially inward projecting arm. The actuator also can have a divot in a radially inward surface of the slide ring, a thrust washer radially inward from the slide ring, a groove in a radially outward surface of the thrust washer, a retaining device disposed in both the divot and the groove, and a compliance device, wherein the compliance device is in contact with and axially in line with the thrust washer and wherein the compliance device is in contact with and axially in line with the arm of the slide ring.

Axle disconnect systems using the actuator are also described, as are methods of maintaining latching of the actuator by using the actuator described herein.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

Figure 1:
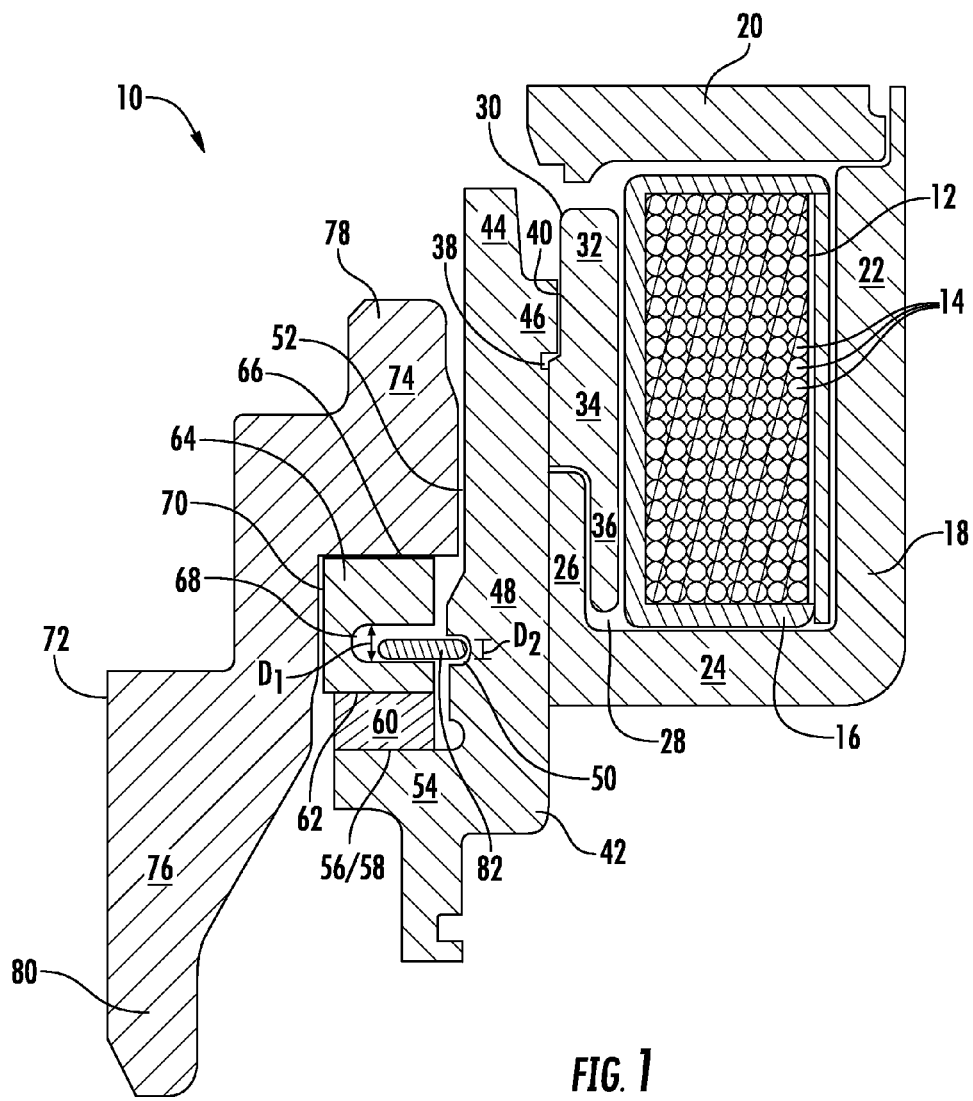
FIG. 1 is a schematic in cross-section of an actuator with a compliant plunger in accordance with an embodiment of the invention.

It is to be understood that the invention may assume various alternative orientations and step sequences, except where expressly specified to the contrary. It is also to be understood that the specific assemblies, articles and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments may be commonly referred to with like reference numerals within this section of the application.

For use in this description only, the terms actuator and solenoid can be used interchangeably.

Turning now to FIG. 1, is an actuator 10 in accordance with one embodiment of the invention. The actuator will include an electromagnetic coil 12 formed of copper windings 14 in an overmold 16. The coil 12 is disposed in a housing 18. The housing 18 can be unitary or can include a separate cover 20. The housing 18 may be of a generally U-shape or generally a J-shape. In the particular embodiment shown, not intended to be limiting, the housing 18 is J-shaped, with an outer wall 22, a side wall 24 and an inner wall 26. The inner wall 26 is separated from the overmold 16, thereby creating a space 28.

Also part of the actuator 10 is a secondary housing piece 30. The secondary housing piece 30 has three portions: a first end portion 32, a middle portion 34, and a second end portion 36. The middle portion 34 has a protrusion 38 that extends past the outer face 40 of the secondary housing piece 30 away from interior of the coil 12. The second end portion 36 of the secondary housing piece 30 is formed as a finger-like projection that fits into the space 28 between the inner wall 26 of the coil housing 18 and the overmold 16.

A slide ring 42 is located between the coil housing 16 and a shift collar 22. More particularly, the slide ring 42 is located radially inward from the inner wall 26 of the coil housing 18 and is in direct contact therewith. The slide ring 42 is also in contact with the secondary housing piece 30. A first end 44 of the slide ring 42 has a catch 46 that projects radially outward from the slide ring 42. The catch 46 abuts the face 40 of the secondary housing piece 30. The slide ring 42 also has a body portion 48. The body portion 48 has at least one divot 50 on its inward radial surface 52. An arm 54 extends radially inward from the slide ring 42. A first side 56 of the inwardly extending arm 54 is located axially adjacent a first side 58 of a compliant element 60.

The slide ring 42 is adapted for selective axial movement. The slide ring 42 is constructed of a metallic material that is susceptible to magnetic forces, such as steel.

The compliant mechanism 60 abuts the arm 54 of the slide ring 42 on a first axial side 58, and on a second axial side 62, opposite the first axial side 58, abuts a thrust washer 64. The outer radial surface 66 of thrust washer 64 has a groove 68 of width $D_1$ disposed therein. The thrust washer 64 is disposed in a recess 70 defined by a shift collar 72.

The compliant mechanism 60 can be a spring, rubber, or other compressible material. It will have a spring rate of K. K will vary depending on the exact materials and overall design. The thrust washer 64 is made from a wear resistant material, such as, but not limited to, plastic, epoxy or other polymer.

The shift collar 72 is located directly radially inward from the slide ring 42 and directly radially outward from an output shaft (not shown), and has a first portion 74 and a second portion 76. The first and second portions 74, 76 are unitary and one-piece with one another. More particularly, the first portion 74 is located directly radially inward from the slide ring 42 and extends radially outward parallel to the radially inwardly extending arm 54 of the slide ring 42. The first portion 74 of the shift collar 72 has a first set of axially extending teeth 78.

The second portion 76 is located radially inward from the first portion 74, and extends in an axial direction parallel with the output shaft (not shown). The second portion 76 defines a first set of axially extending splines 80. The splines 80 are integrally formed and unitary with the shift collar 72 and allow for axial movement along the output shaft (not shown).

In addition, at least a portion of a retaining device 82 with width $D_2$ is disposed within the groove 68 of the thrust washer 64. The width $D_2$ of the retaining device 82 is less than the width $D_1$ of the groove 68. The difference in widths allows for some 'play' in between the retaining device 82 and the thrust washer 64. The retaining device 82 will also be at least partially disposed in divot 50 in the slide ring 42.

In preferred embodiments, the retaining device 82 is an ID/OD retaining device that is well-known in the mechanical arts and widely commercially available.

Figure 2:
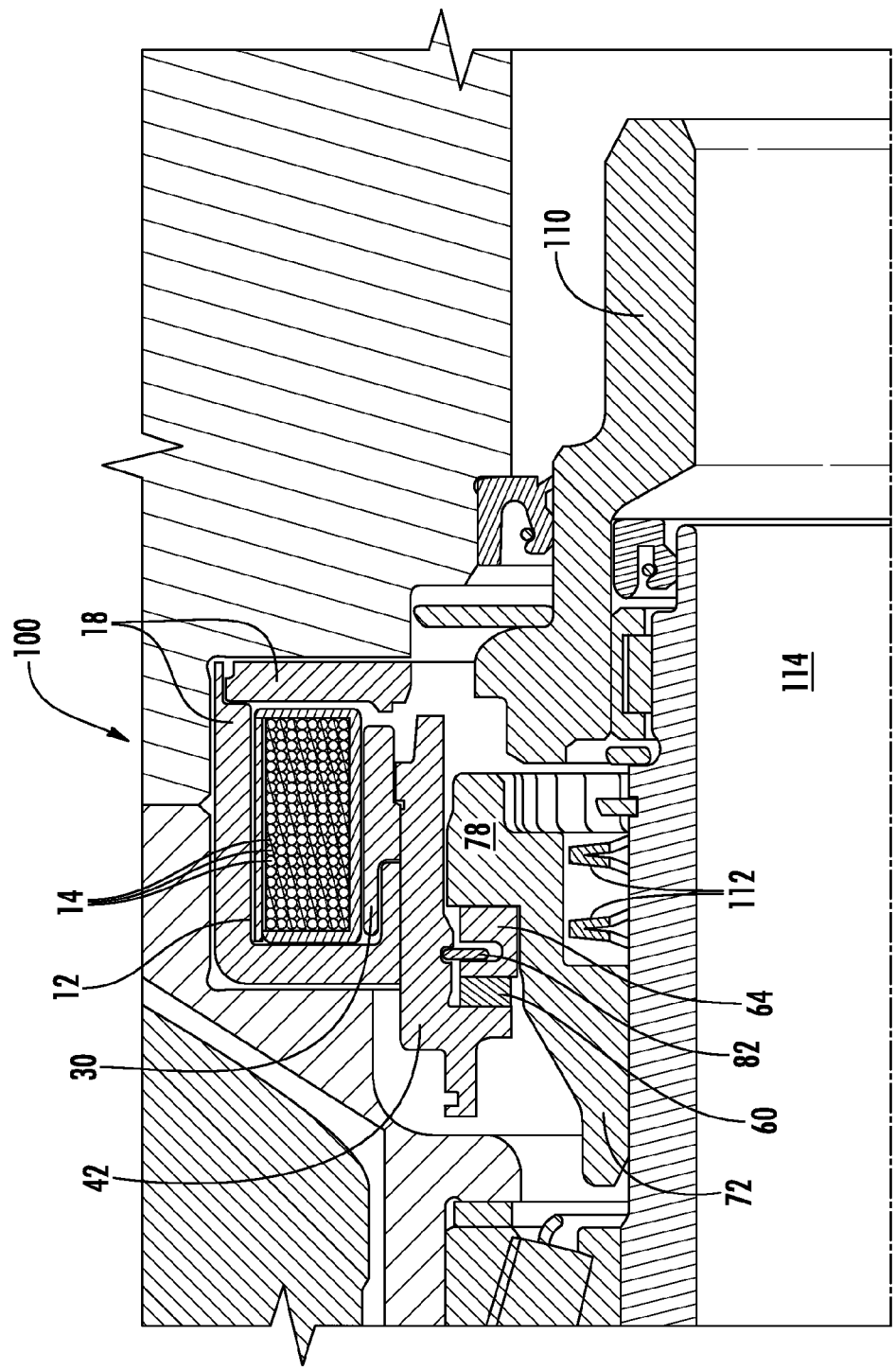
FIG. 2 shows a schematic cross sectional view of an axle disconnect system with an embodiment of an actuator in accordance with the invention.

FIG. 2 shows the actuator of FIG. 1 in an environment typical of an axle disconnect system 100. The system has two modes of operation. In a first mode of operation as depicted in FIG. 2, the shift collar 72 and output gear 110 are not connected or rotating together, but sometimes it is desired that they be connected so that they rotate together. When this mode is to be used, electricity is sent to the coil 12 and the coiled wires 14 create a magnetic flux. In other words, the current in the coil 14 causes the coil housing 18 to become magnetized. The sum of the coil flux and the housing magnetism causes the slide ring 42 to move in an axial direction. The force generated by the movement of the slide ring 42 is greater than the sum of the spring force generated by return springs 112 and friction force of the slide ring 42. Within a few milliseconds of the coil 12 being energized, the magnetic flux contributes to the magnetic slide ring 42 moving in the axial direction. The slide ring 42 axially moves the compliant device 60 and retaining device 82, which in turn axially moves the shift collar 72 pushing the shift collar 72 into engagement with the output gear 110.

As the first mode is being engaged, teeth 78 on the shift collar 72 are not engaged with the output gear 110; a gap separates the teeth on the shift collar 72 and the output gear 110. However, as the shift collar 72 is moved, the gap separating the two closes. In a short amount of time, on the order of milliseconds, the gap is closed and the teeth 78 on the shift collar 72 engage with the output gear 110. Upon engagement the shift collar 72 is rotationally fixed to the output gear 110. The rotation from the shift collar 72 is transferred through the output gear 110 to the output shaft 114.

The design is engineered specifically for the a particular application by adjusting the spring rate K of the compliance device 60 and the amount of axial travel the actuator 10 is required to tolerate. The design is engineered so that peak force generated from the compliance device 60 is less than the minimum holding force generated by the actuator 10. In the event of an axial force being applied to the shift collar 72, the shift collar 72 will move towards the actuator 10. This movement will then push on the thrust washer 64, compressing the compliance device 60. The compliance device 60 will continue to compress until the axial travel of the thrust washer 64 is reduced to zero. After the axial force event is over, the compliance device 60 and thrust washer 64 will push the shift collar 72 back into position.

Although this actuator 10 is shown, various embodiments are contemplated to be within the scope of the invention, including actuators with differently shaped covers, armatures and housings. The way the slide ring and housing interact can vary, as can how the slide ring and cover interact upon engagement. The actuator 10 shown is just one of many possibilities. One important aspect of the invention is that the actuator be able to stay engaged, or latched, even when an axial force is applied to the solenoid. Such a force can be the result of vibrations or other physical forces stemming from movement of the parts surrounding the actuator or the vehicle itself.

As noted previously, the axle disconnect system described above is just one example of many systems in which the current invention can be used. Variations in axle disconnect systems might include different shapes of coil housing 16, or the addition or subtraction of other elements in the system.

Also, it can be appreciated that one embodiment of the system described and depicted herein is for an axle connect/disconnect system. However, the device described herein is not limited to just axles. Instead, the device can be applied to other devices, equipment and methods known in the automotive arts including, but not limited to, power take off units, differentials, and power transfer units. Several examples of systems that can be used with actuators of the invention can be found in U.S. patent application Ser. No. 14/606,066, hereby incorporated herein to the full extent permitted by law, which discusses several axle disconnect and power take-off unit systems, all of which could be used with actuators containing compliant plungers as described herein.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. An actuator comprising:
   an electromagnetic coil comprising copper windings disposed in an overmold,
   a housing at least partially surrounding the coil,
   a slide ring radially inward from the housing, wherein the slide ring is in sliding engagement with the housing, wherein the slide ring has a radially inward projecting arm,
   a divot in a radially inward surface of the slide ring,
   a thrust washer radially inward from the slide ring,
   a groove in a radially outward surface of the thrust washer,
   a retaining device disposed in both the divot and the groove,
   a compliance device, wherein the compliance device is in contact with and axially in line with the thrust washer and wherein the compliance device is in contact with and axially in line with the arm of the slide ring.

2. The actuator of claim 1, wherein the compliance device has a spring rate K.

3. The actuator of claim 2, wherein the compliance device comprises a device selected from the group of: a spring, rubber, or other compressible material.

4. The actuator of claim 1, wherein the groove has a width $D_1$ and the retaining device has a width $D_2$, and $D_1$ is greater than $D_2$.

5. An axle disconnect system comprising:
   an actuator comprising
      an electromagnetic coil comprising copper windings disposed in an overmold,
      a housing at least partially surrounding the coil,
   a slide ring radially inward from the housing, wherein the slide ring is in sliding engagement with the housing, wherein the slide ring has a radially inward projecting arm,
   a divot in a radially inward surface of the slide ring,
   a thrust washer radially inward from the slide ring,
   a groove in a radially outward surface of the thrust washer,
   a retaining device disposed in both the divot and the groove,
   a compliance device, wherein the compliance device is in contact with and axially in line with the thrust washer and wherein the compliance device is in contact with and axially in line with the arm of the slide ring,
   wherein the slide ring axially slidable and wherein the slide ring located between (i) said coil housing and (ii) a shift collar, said slide ring comprising a radially outer surface, the radially inner surface, a first end and a second end;
   said shift collar comprising a first portion and a second portion, said first portion is located directly radially inward from said slide ring, said first portion defining a first set of axially extending teeth, said second portion is located radially inward from said first portion; and
   an output gear comprising a second set of axially extending teeth for engagement with said shift collar first set of teeth.

6. The axle disconnect system of claim 5, wherein the compliance device has a spring rate K.

7. The axle disconnect system of claim 5, wherein the compliance device comprises a device selected from the group of: a spring, rubber, or other compressible material.

8. The axle disconnect system of claim 5, wherein the groove has a width $D_1$ and the retaining device has a width $D_2$, and $D_1$ is greater than $D_2$.

9. A method of maintaining engagement of an actuator comprising the steps of:
   (i) providing an actuator, wherein the actuator comprises
      an electromagnetic coil comprising copper windings disposed in an overmold,
      a housing at least partially surrounding the coil,
      a slide ring radially inward from the housing, wherein the slide ring is in sliding engagement with housing, wherein the slide ring has a radially inward projecting arm,
      a divot in a radially inward surface of the slide ring,
      a thrust washer radially inward from the slide ring,
      a groove in a radially outward surface of the thrust washer,
      a retaining device disposed in both the divot and the groove,
      a compliance device, wherein the compliance device is in contact with and axially in line with the thrust washer and wherein the compliance device is in contact with and axially in line with the arm of the slide ring, and
   (ii) absorbing incidental axial movement of the actuator or one of its components by compression of the compliance device.

10. The method of claim 9, wherein the compliance device has a spring rate K.

11. The method of claim 10, wherein the compliance device comprises a device selected from the group of: a spring, rubber, or other compressible material.

12. The method of claim 9, wherein the groove has a width $D_1$ and the retaining device has a width $D_2$, and $D_1$ is greater than $D_2$.

* * * * *